2 Sheets—Sheet 1.

H. G. BUTLER.

SCRAPER OPERATING APPARATUS.

No. 11,435. Reissued Aug. 14, 1894.

Witnesses:
Jesse F. Mingen
Luther S. Alter

Inventor:
Henry G. Butler,
By Dyrenforth & Dyrenforth,
Attys.

2 Sheets—Sheet 2.

H. G. BUTLER.

SCRAPER OPERATING APPARATUS.

No. 11,435. Reissued Aug. 14, 1894.

Witnesses:
Jesse Minger
Lutie G. Alter

Inventor:
Henry G. Butler
By Dyrenforth and Dyrenforth
Att'ys.

UNITED STATES PATENT OFFICE.

HENRY G. BUTLER, OF KENOSHA, WISCONSIN, ASSIGNOR OF ONE-HALF TO WILLIAM BUTLER, OF SAME PLACE.

SCRAPER-OPERATING APPARATUS.

SPECIFICATION forming part of Reissued Letters Patent No. 11,435, dated August 14, 1894.

Original No. 491,765, dated February 14, 1893. Application for reissue filed May 7, 1894. Serial No. 510,419.

*To all whom it may concern:*

Be it known that I, HENRY G. BUTLER, a citizen of the United States, residing at Kenosha, in the county of Kenosha and State of Wisconsin, have invented a new and useful Improvement in Scraper-Operating Apparatus, of which the following is a specification.

My invention relates to an improvement in the class of apparatus involving cable-winding mechanism for operating a scraper, dredge or other form of conveying means, such as would be employed in railroad grade and levee construction, dredging, excavating for foundations and sewers, for feeding clay to the "fire" in burning clay to make ballast, and in stone-quarries, and the like; and it relates, more definitely stated, to an improvement in the class of such mechanism in which the winding mechanism involves a pair of winding-drums supported on a preferably locomotive base, such as a car or boat, and driven by a suitable engine and controllable to produce the three filling, hoisting and conveying operations of the scraper.

My improved apparatus is advantageously applicable to any of the uses referred to, but for the sake of convenience and to avoid prolixity, I confine the description hereinafter contained, mainly, to use thereof in connection with ballast-burning and illustrate it in the form best adapted thereto in the accompanying drawings, in which—

Figure 1:
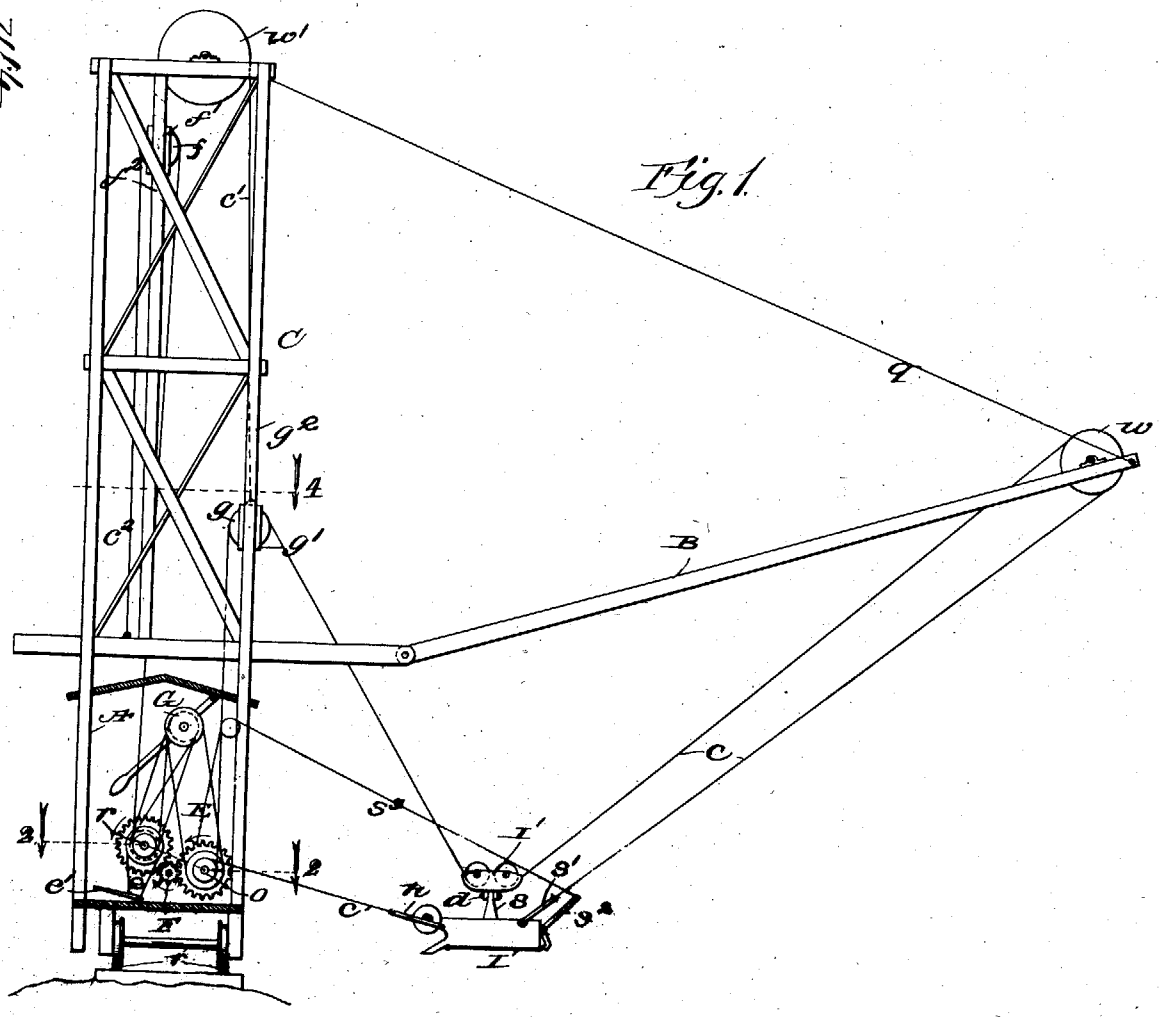
Figure 2:
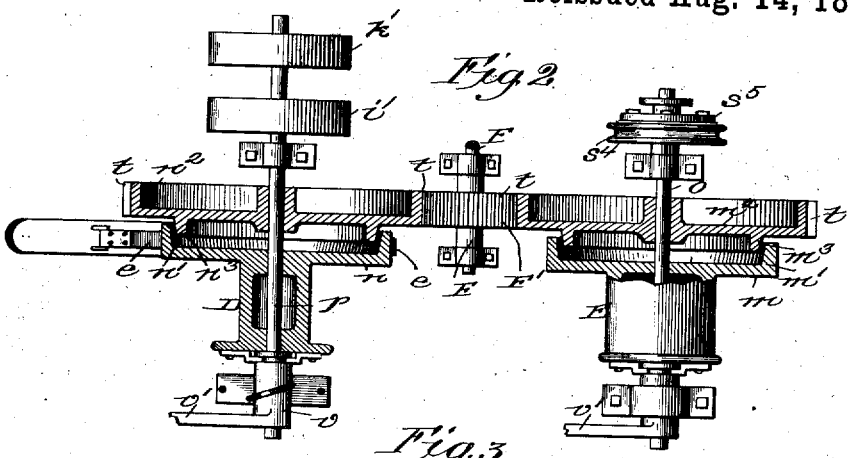
Figure 3:
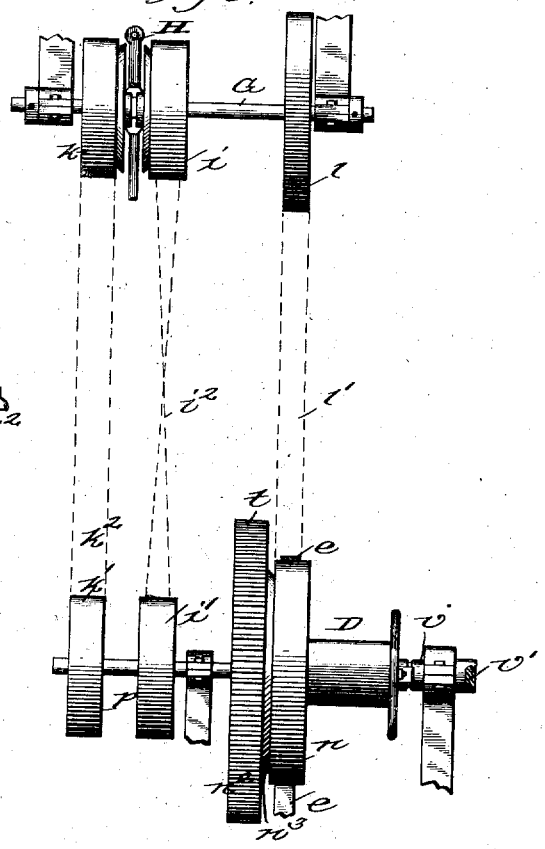
Figure 4:
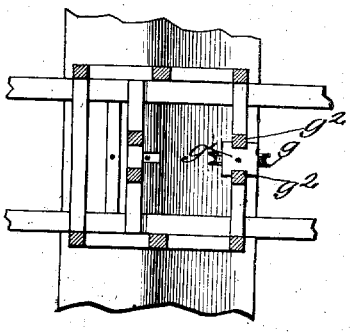

Figure 1 is a view in end elevation, diagrammatic in its nature, of the apparatus; Fig. 2, a section taken at the line 2—2 on Fig. 1, viewed in the direction of the arrows, and enlarged; Fig. 3, a broken enlarged view showing drum and counter-shaft mechanism in side elevation with their sheave-connecting belts in dotted representation; and Fig. 4, a section taken at the line 4 on Fig. 1, viewed in the direction of the arrow and enlarged.

A is the support for my improved mechanism, shown in the form of a car movable on a track $r$, which may be considered, for the purposes of the further description, to extend along a pile of burning clay or ballast-burning "fire," toward which the boom B projects.

C is a tower or "mast" structure extending above the roof of the car to which, in a usual or any suitable manner, is attached the boom, preferably by pivotally supporting it at its inner end and, at its outer end, by stay-rods or cable $q$ fastened to the upper portion of the mast.

D and E are drums loosely supported on rotary shafts $p$ and $o$ journaled in suitable supports on the car and provided with clutch-mechanism for causing, at will, the drums to rotate with them. The clutch-mechanism is preferably of the friction-clutch variety, and comprises expanded disk-heads $n$ and $m$ of the respective drums, having flange-extensions $n'$ and $m'$ widening outwardly to form the female parts of the clutches, and the disks $n^2$ and $m^2$ secured on the shafts and having tapering flange-extensions $n^3$ and $m^3$ to receive and be engaged by the flange-extensions $n'$ and $m'$. As means for working the drums back and forth on their shafts to clutch and unclutch them, each may be provided (see Fig. 2) with a worm-collar $v$ operated by a handle $v'$ to work in a journal-bearing o the respective shaft. The disks $n^2$ and $m^2$, which are made hollow for lightness and economy, are provided circumferentially with cog-teeth $t$, engaged by an interposed pinion F' on the rotary driving-shaft F, driven by any suitable engine, (not shown, but preferably of the double cylinder and piston steam variety.) Thus the two shafts $p$ and $o$ with their clutch-sections $n^2$ and $m^2$ are constantly driven in corresponding directions and accordingly drive the drums when clutched to them.

G is a counter-shaft journaled in suitable bearings in the upper portion of the car, and carrying, near one end, the fast pulley $l$, and near the opposite end a pair of loose pulleys $k$ and $i$, adapted to be alternately engaged with the countershaft to rotate with it by means of an interposed clutch H, of any suitable or well known construction. The pulleys $k$ and $i$ are connected with pulleys $k'$ and $i'$, fast on the shaft $p$ of the drum D, respectively by a straight endless belt $k^2$, and a crossed endless belt $i^2$; and the clutch-disk $m$ of the drum E forms a pulley connected by a straight endless belt $l'$ with the fast pulley $l$ on the counter-shaft.

I is a conveyer or scraper, of any suitable construction, but preferably, for the connection herein shown, involving that of the scraper set forth in my concurrent application for Letters Patent of the United States, Serial No. 446,294, filed on the 19th day of September, 1892. From the draft-bar $h$ at its forward end, the scraper I is connected with the drum E by a cable $c$ wound about the drum a desired number of times, proceeding thence, over a sheave $g$ under a sheave-carriage I′, having a bifurcated extension $d$ on its base between the prongs of which the hanger $s$ of the scraper is pivotally supported. From the carriage the cable proceeds over a guide-pulley $w$ at the end of the boom where it is thus suspended to the supplemental pivotal hanger $s'$ near the rear end of the scraper. If the scraper be provided, as represented, with a hinged bottom adapted to be fastened, when closed, by a catch $s^2$, the latter may be operated to release the bottom and permit it to fall for dumping the contents of the scraper, by connecting it through the medium of a cable $s^3$ with a sheave $s^4$ loosely supported on an end of the drum-shaft $o$ carrying a suitable clutch $s^5$ for engaging the sheave with the shaft at will.

I prefer that the pulley $g$ shall be vertically movable, and to that end support it in a block $g'$ confined between vertical guides $g^2$ in the mast-structure, and suspended, on a sheave $w'$ journaled on the upper end of the mast at one end of a cable $c'$, the opposite end of which is connected with a pulley $f$, in all respects like the pulley $g$, being supported in a block $f'$ confined to move vertically in guides $f^2$. The pulley $f$ should be considerably heavier than the pulley $g$, as by weighting, to cause it the better to counterbalance the latter and the scraper and to take up the slack of the cable $c$ while the scraper is filling. The pulley $f$ is connected with the drum D by a cable $c^2$ fastened at one end to the drum, passing thence over the pulley $f$ and fastened at its opposite end to a stationary object, as to the base of the mast.

The operation is as follows: Supposing the scraper to be down on the ground in position to be dragged toward the car A to fill, and the shaft F to be in motion in the direction indicated by an arrow on Fig. 1 (whereby the shafts $p$ and $o$ will be rotated continuously in the direction indicated by arrows) then by clutching the drum E to its shaft $o$ the cable $c$ will be wound at the length between the drum E and the draft-bar $h$ and drag the scoop toward the car, thereby filling it, the practically endless cable $c$ meantime paying out in the opposite direction to permit the described hauling or dragging thereof. The clutch of the drum E is then actuated to release it, and that of the rear drum D actuated to clutch the latter to its shaft, whereby the cable $c^2$ is wound thereon and thus shortened, thereby pulling downward the block $f'$ and consequently raising the block $g'$, which effects hauling up the cable $c$, and the exertion of a rapid lift on the scraper I simultaneously at its hanger-bars and draw-bar. When the scraper has been thus lifted to the desired elevation, the drum D is unclutched and a brake applied to quickly overcome its inertia. This brake is represented in the form of a metal band $e$ supported to extend circumferentially about the upper portion of the periphery of the disk-flange $n'$ and having its ends connected with a foot-lever $e'$, whereby pressure on the lever will tighten or clamp the band against the disk. Then the scraper is rapidly carried outward to any desired distance toward the end of the boom B, to the point of dumping on the "fire," by clutching the pulley $i$ to the counter-shaft, whereby the crossed-belt-connection of the drum-shaft pulley $i'$ with the counter-shaft rotates the latter in a direction which effects, through the pulley $l$ and belt $l'$, rotation of the clutch-disk $m$ and drum E in a direction contrary to that already described thereof and indicated by an arrow, causing the cable $c$ to pay out accordingly between the drum and scraper draft-bar $h$. The inertia of the scraper in proceeding to the point of dumping is quite great, so that its momentum is sufficient, on releasing the clutch H and applying the clutch $s^5$ when the desired point of dumping is reached, to trip the catch $s^2$ and permit the scraper-bottom to fall. Thereupon the scraper is rapidly hauled back to the point of filling by clutching the pulley $k$ on the counter-shaft G, whereby it is rotated, correspondingly with the drum-shaft $p$, in the direction causing its pulley $l$ and belt-connection with the clutch-head $m$ on the drum E to rotate the latter rapidly in the direction for winding upon it the cable $c$ from the scraper-hanger $h$. When the scraper has thus been quickly brought to the filling point and the brake on the drum D released to permit the scraper to drop into filling position, whereby the pulleys $f$ and $g$ resume the normal positions in which they are illustrated, the counter-shaft pulley $k$ is unclutched and the drum E is again clutched to its shaft $o$ to be thereby rotated in the direction to effect, slowly, the refilling of the scraper, whereupon the hoisting, conveying and dumping operations on the loaded scraper are again successively produced in the manner already described.

The operations of lifting the scraper, carrying it to the point of dumping, and returning it to the filling point are, thus, performed rapidly by reason of the comparatively large diameters of the pulleys on the drum-shafts and counter-shaft brought into play for these purposes; and it will also be seen that the filling operation, which is effected entirely by the winding of the length of cable $c$ extending from the scraper draft-bar $h$, on the drum E of comparatively small diameter, is accordingly slow. These functions are important, since, as will be understood, there is object in speeding the first-named operations of the scraper while the filling thereof, to be reliable and effective, should be comparatively slow for steadiness, that is to prevent tipping or jumping.

Where the nature of the work to be performed requires a thickness of the cable *c* between the scraper and drum E that would render it too inflexible to run readily over the pulleys, that portion of the cable which runs over the pulleys may be provided in two or more adequately flexible thinner strands both fastened to the drum, and provided in sufficiently extra length and lapped on the drum an extra number of times to insure the winding on of the thick section while the thinner ones are unwinding.

While the several operations are described as proceeding singly, an operator will readily become sufficiently expert to perform simultaneously those that are intended to be so performed.

It will be observed that, inasmuch as the scraper is conveyed by the carriage I′ on the cable *c* as it ascends and descends, the advantage ensues of the employment of the gravity of the scraper in traveling by reason of the center of gravity changing with the rise and fall of the front pulley *g*. This function of the pulley *g* is, however, not vitally important in my improvement, as the power for producing the hoisting and traveling operations of the scraper may be applied directly over a pulley *g*, if stationary.

For some classes of work, as in removing mounds, where the track cannot be laid on the top of them, in banking railways, and the like, the scraper requires to be operated for filling in the contrary direction to that described, when the cable *c* on the drum E would be accordingly reversed and the scraper pointed outward.

It should be mentioned that instead of employing a boom B, the cable *c* can be suspended at a point as far away from the winding mechanism and as high as may be desired; and the anchorage may be a movable tower. In the latter case the apparatus is especially serviceable as a mere conveyer, the carriage I′ then serving as a medium for supporting any suitable form of receptacle or holder.

What I claim as new, and desire to secure by Letters Patent, is—

1. In an apparatus of the nature set forth, the combination with a driving-shaft on a suitable support carrying a mast, and a boom of winding-mechanism on the support, having a rotary drum, a traveling cable winding about said drum and extending endlessly between it and the boom toward its outer end, a conveyer suspended from the upper length of said cable and fastened in the lower length thereof, and a vertically adjustable guide-pulley over which the said upper length of the cable passes, substantially as described.

2. In an apparatus of the nature set forth, the combination with a driving-shaft on a suitable support, of winding-mechanism having drums loosely supported on rotary shafts provided with clutch-mechanism, a counter-shaft carrying loose pulleys respectively geared reversely with one of said drums, clutch-mechanism for said pulleys and a tight-pulley geared with the other drum, and a traveling conveyer supported on a cable fastened at its opposite ends to the last-named drum and suspended between its ends at a suitable distance from the winding-mechanism, substantially as described.

3. In an apparatus of the nature set forth, the combination with a driving-shaft on a suitable support, of winding-mechanism comprising a pair of drums D and E loosely supported on rotary-shafts provided with clutch-mechanism, a counter-shaft geared to the drum D to be rotated thereby in either direction at will and geared to the drum E to rotate it in the direction of rotation of the drum D, a cable *c* fastened at opposite ends to the drum E, and suspended between its ends at a suitable distance from the winding-mechanism, and a traveling conveyer, supported on the cable, the drum E being operated by the drum D through the counter-shaft to propel and return the conveyer, substantially as described.

4. In an apparatus of the nature set forth, the combination with a driving-shaft on a suitable support, of winding-mechanism comprising a pair of drums D and E loosely supported on rotary-shafts provided with clutch-mechanism involving the disk-gears $n^2$ and $m^2$, a pinion the driving-shaft between and meshing with said disk-gears, a counter-shaft geared to the drum D to be rotated thereby in either direction at will and geared to the drum E to rotate it in the direction of rotation of the drum D, a cable *c* fastened at opposite ends to drum E and suspended between its ends at a suitable distance from the winding-mechanism, and a traveling-scraper supported on and fastened to the cable, the drum E being operated by the drum D through the counter-shaft to wind and unwind the cable for propelling and returning the scraper and directly by the driving-shaft to wind the cable for filling the scraper, substantially as described.

5. In an apparatus of the nature set forth, the combination with a driving-shaft on a suitable support of winding drums D and E and a counter-shaft G through the medium of which the drum E is geared with and driven by the drum D, a cable *c* fastened at opposite ends to the drum E and suspended between its ends at a suitable distance from the winding-mechanism, and a conveyer supported on the cable, substantially as described, 6. In an apparatus of the nature set forth, the combination with a driving-shaft on a suitable support, carrying a mast C, of winding mechanism comprising a pair of drums D and E loosely supported on rotary-shafts provided with clutch mechanism, a counter-shaft G geared to the drum D to be rotated thereby in either direction at will and geared to the drum E to rotate it in the direction of rotation of the drum D, vertically movable pulleys $g$ and $f$ in guides on the mast and connected by a cable $c'$ passing over a guide $w'$, a cable $c$ fastened at opposite ends to the drum E, suspended between its ends at a suitable distance from the winding-mechanism, and passing over the pulley $g$, a traveling-conveyor supported on the cable $c$ and a cable $c^2$ fastened at one end to the mast, passing thence over the pulley $f$ and fastened at its opposite end to the drum D, the whole being constructed and arranged to operate substantially as described.

7. In an apparatus of the nature set forth, the combination with a driving-shaft on a suitable support carrying a mast C, of winding mechanism comprising a pair of drums D and E loosely supported on rotary shafts provided with clutch-mechanism, a counter-shaft G geared to the drum D to be rotated thereby in either direction at will and geared to the drum E to rotate it in the direction of rotation of the drum D, vertically movable pulleys $g$ and $f$ in guides on the mast and connected by a cable $c'$ passing over a guide $w'$, a cable $c$ fastened at opposite ends to the drum E, suspended between its ends at a suitable distance from the winding mechanism and passing over the pulley $g$, a traveling-scraper I having a hinged bottom provided with a catch connected with the drum E, said scraper being supported on and fastened to the cable $c$, a cable $c^2$ fastened at one end to the mast, passing thence over the pulley $f$ and fastened at its opposite end to the drum D, a dumping-attachment on the drum E and a brake for the drum D, the whole being constructed and arranged to operate substantially as described.

8. A scraper-operating apparatus comprising, in combination with a support A carrying a mast C, boom B, and driving-shaft F, having a pinion F', rotary shafts $p$ and $o$ provided with clutch gear-disks $n^2$ and $m^2$ meshing with the pinion, drums D and E loosely supported on said rotary shafts and provided with clutch-heads $n$ and $m$ and means for throwing them in and out of clutch, a brake for the drum D, pulleys $k'$ and $i'$ fixed on the shaft $p$, a counter-shaft, G carrying loose pulleys $k$ and $i$ provided with an interposed clutch H and respectively geared by a straight belt $k^2$ and a cross-belt $i^2$ with the pulleys $k'$ and $i'$, a fixed pulley $l$ on the counter-shaft connected by a belt $l'$ with the clutch-head $m$ of the drum E, pulleys $g$ and $f$ supported and vertically movable in guides on the mast and connected by a cable $c'$ passing over a guide-pulley $w'$, a cable $c^2$ fastened at one end to the mast, passing thence over the pulley $f$ and fastened at its opposite end to the drum D, a cable $c$ passing over a pulley $w$ at the end of the boom and over the pulley $g$ and fastened at its opposite ends to the drum E, a scraper I supported and fastened on the cable $c$ and having a hinged bottom I' provided with a catch $s^2$ and a dumping-attachment on the drum E with which the said catch is connected, the whole being constructed and arranged to operate substantially as described.

HENRY G. BUTLER.

In presence of—
M. J. FROST,
W. U. WILLIAMS.